Oct. 25, 1932.    M. H. RICE    1,884,242

WEIGHING SCALE

Filed Jan. 12, 1932    2 Sheets-Sheet 1

Inventor,
Merrit H. Rice.

By N. N. Byrne

Attorney

Oct. 25, 1932.  M. H. RICE  1,884,242
WEIGHING SCALE
Filed Jan. 12, 1932  2 Sheets-Sheet 2
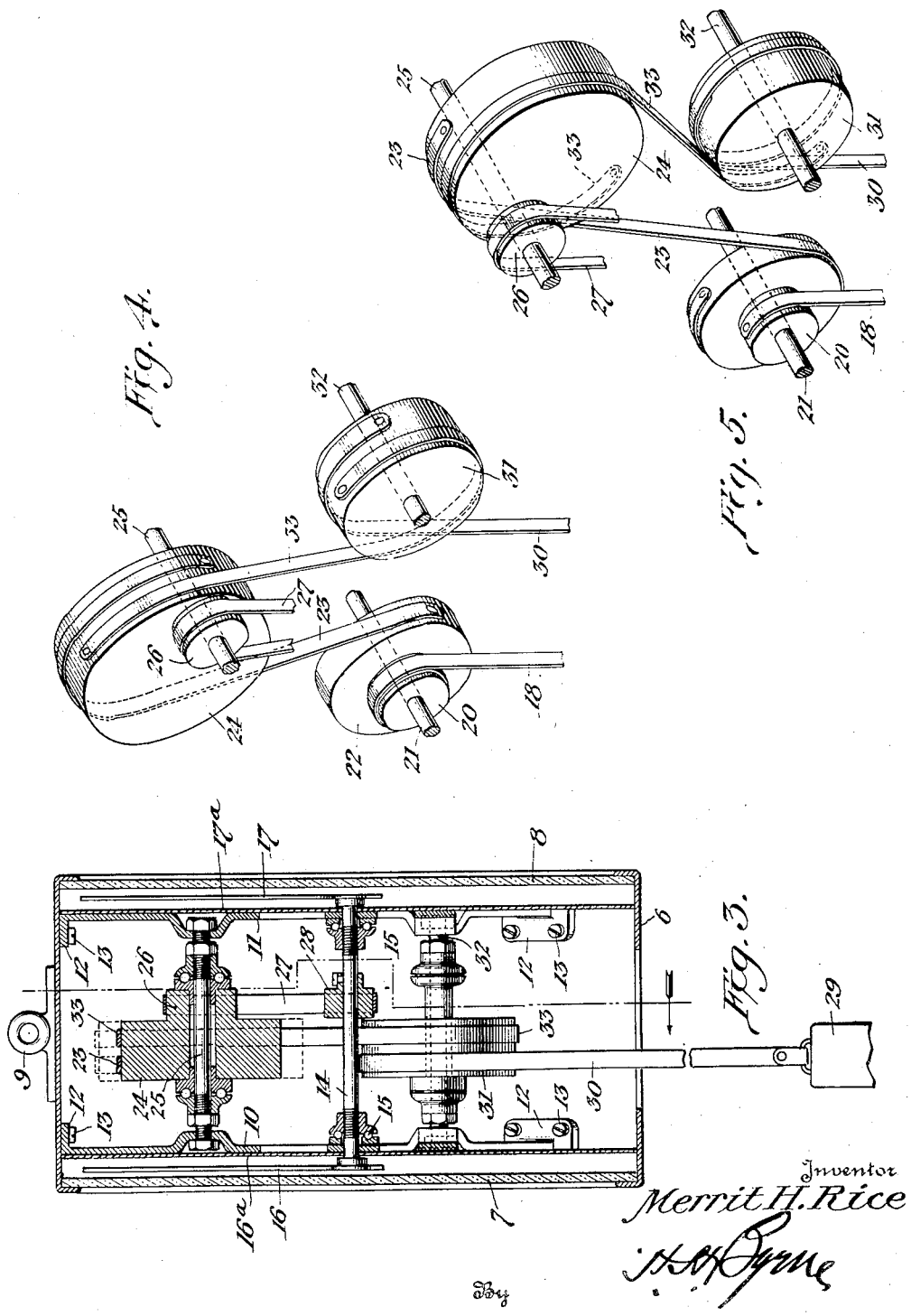
Inventor
Merrit H. Rice Patented Oct. 25, 1932

1,884,242

UNITED STATES PATENT OFFICE

MERRIT H. RICE, OF PASADENA, CALIFORNIA

WEIGHING SCALE

Application filed January 12, 1932. Serial No. 586,195.

The present invention relates to weighing scales and consists in the combinations and arrangements of elements hereinafter described and particularly set forth in the accompanying claims.

The invention has for its purpose to provide a scales of this type wherein no springs are used to the end of avoiding the necessity for adjustments or other regulation which characterize scales employing springs; and which in its entirety embodies the minimum number of parts so constructed and arranged as to reduce friction to a minimum thereby insuring no lost motion or other defects which go to the accuracy of the instrument.

With the present used spring scales it is required that the same be continually subjected to adjustment due to variable temperatures which obviously detracts from the efficiency of the instrument inasmuch as temperature changes are not usually in accordance with any fixed law, but on the other hand are quite variable. To overcome these disadvantages the invention here proposed is characterized in being without springs and is also free from inter-meshing gears or pinions.

Summarily stated, the scale employs an eccentrically mounted disc or pulley which is connected with a load operated pulley and a load counter-balancing pulley by a novel system of strip-bands having their respective ends attached to the perimeters of the pulleys to work with the minimum amount of friction. By using an eccentrically mounted pulley the relative changes of radii therein provide the variable leverage of power from the load controlled pulley to the load counter-balancing pulley, and which in turn co-act with the weight indicating device to accurately show the amount of the load quite regardless of the place, time of year, or temperature condition when used. That is to say, the scale herein disclosed is uniformly constant under all working conditions.

Figure 1:
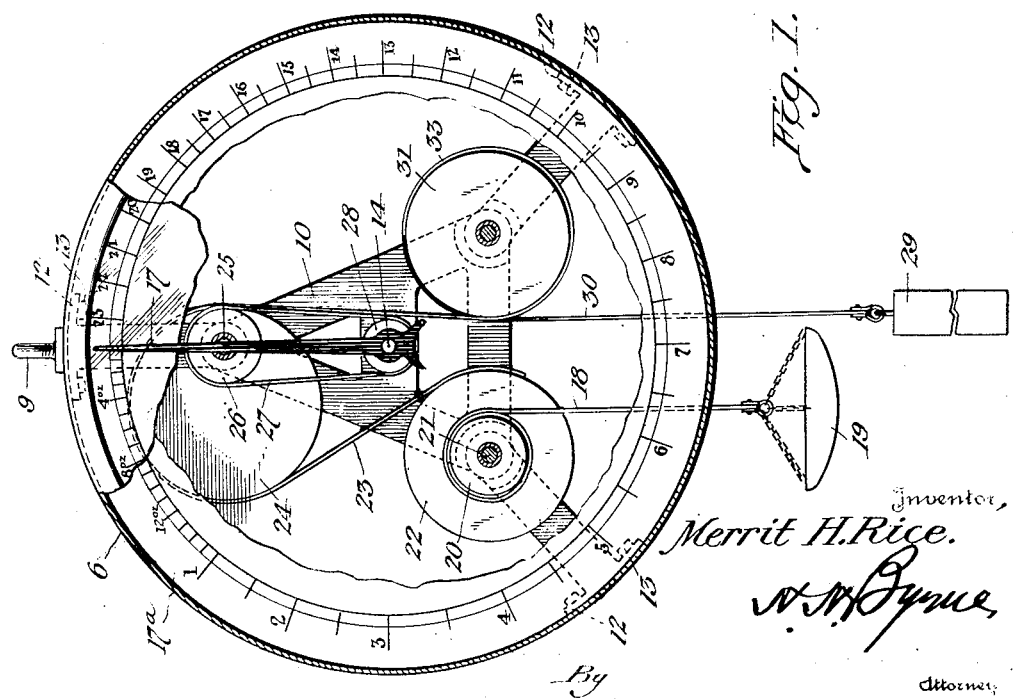

The invention is shown by way of illustration in the accompanying drawings wherein:

Figure 1 is a front elevational view of the scales with parts broken away for clearness.

Figure 2:
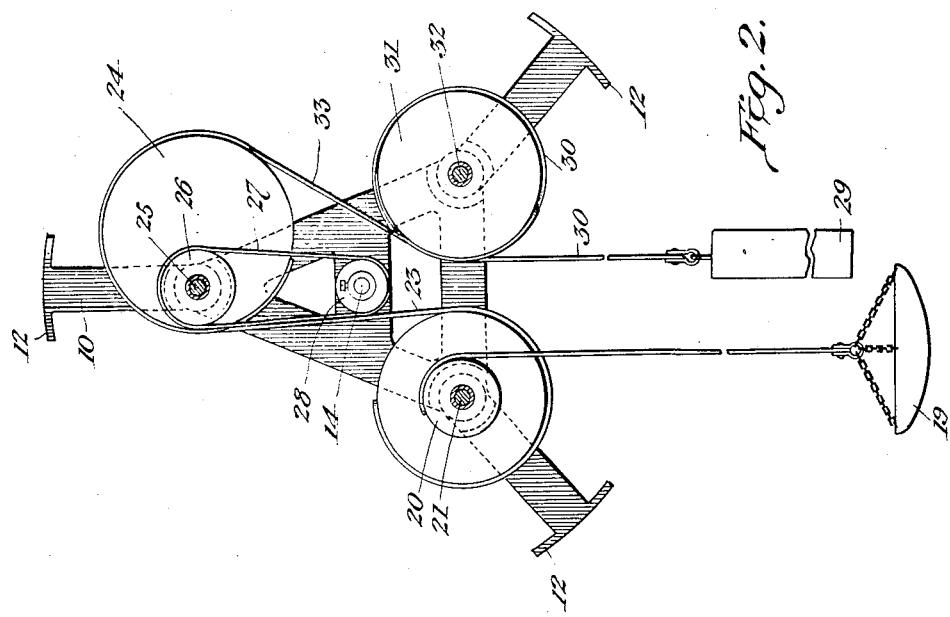

Figure 2 a sectional view taken on the line 2—2 of Figure 3.

Figure 3 a transverse sectional view.

Figure 4 a perspective development of the scales pulley arrangement showing the parts in one position; and Figure 5 a similar view showing the parts in another position.

Referring to the construction in further detail and wherein like reference characters designate similar parts in the different views, the scale consists of a cylindrical casing 6 constructed preferably of metal having glass or transparent closures 7 and 8, and an eye piece 9 for suspending the same from a suitable support as shown. The scales mechanism is mounted in a pair of frames or spiders 10 and 11 having flange portions 12 for securing to the casing by the screw bolts 13, the whole forming a simple and rigid structure.

The operative parts or workings of the instrument consists of a centrally located shaft 14 suitably journalled in ball bearings 15 on the frames 10 and 11 and carrying at its respective ends two (2) pointers or fingers 16 and 17 that indicate on the opposite dial faces 16ª and 17ª the weight of the load carried in the pan 19 suspended from the band-strip 18. Said band-strip is secured at its free end to the pulley 20 mounted on shaft 21, and a similar and larger pulley 22 is fixedly mounted on said shaft immediately against the pulley member 20 (see Figures 4 and 5). That is to say, the pulley elements 20 and 22 virtually comprise a double or compound pulley, and said compound pulley together with the band-strip 18 and pan 19 constitute the primary elements of the load actuated part of the mechanism.

The load actuated pulley 22 connects by a band-strip 23 with a double pulley 24 which is eccentrically mounted by ball bearings on the shaft 25, and a second and smaller concentric pulley 26 formed integral with double pulley 24 carries a belt 27 that works with pulley 28 on the central shaft 14 of the weight indicating device.

The load counter-balancing element of the scales consists of a weight 29 suspended from the free end of band strip 30 that partially winds around the smooth double pulley 31 and is fastened thereto at one end as shown in Figure 4. Said pulley 31 has ball bearing journals on the shaft 32 and by the reversely wound band-strip 33 connects with the eccentric pulley 24 on the shaft 25.

It will therefore be seen from the foregoing that the weight of the material in the pan 19—or weighing platform connected to the strip 18—will impart movement to the eccentric pulley 24 and which through its variable leverage will give the relative changes of power from the weight or load side of the scales to the counter-balancing side thereof, thereby making it possible for a small weight at the longest radii of the eccentric pulley to counter-balance a load imparted to the smallest radius acting thereon. The entire operation of the scales is controlled by the weight 29 hanging freely in the air and is not affected in any way by changes of temperature. This weight and the weighing of the scales remains the same either in winter or summer, and obviously needs no adjustment. The employment of the ball bearings for all moving parts reasonably assures no lost motion in the operation of the instrument and in functioning the movements are absolutely accurate inasmuch as no one band-strip or belt can move even an infinitesimal distance without causing the others to move proportionately.

The scales mechanism shown herein may be used in connection with the ordinary pan scales or equally as well with the conventional type of platform scales. In either instance, or wherever else used, all readings or indications are visible from two sides by reason of the double dial faces 16ª and 17ª at the front and rear of the casing. The invention disclosed herein may be properly defined as a "relativity scale".

It is to be understood that the invention as here disclosed is not limited to the details of construction shown and described, and that these may be varied widely without departing from the spirit of the invention as defined by the claims.

What is claimed as new is:

1. In weighing scales, the combination of an eccentrically mounted pulley providing variable leverage, a load operated pulley, a load counter-balancing pulley, bands connecting the eccentric pulley with said load operated and counter-balancing pulleys, and a weight indicating device, substantially as set forth.

2. In weighing scales, the combination of an eccentrically mounted pulley providing variable leverage, a load operated pulley, a load counter-balancing pulley, bands connecting the eccentric pulley with said load operated and counter-balancing pulleys from points on the respective perimeters thereof, and a weight indicating device, substantially as set forth.

3. In weighing scales the combination of a double pulley mounted concentrically and eccentrically respectively, the eccentric pulley providing variable leverage; a load operated pulley, a load counter-balancing pulley, bands connecting the eccentric pulley with said load operated and counter-balancing pulleys, a pulley having a weight indicator, and a belt connecting said concentric and weight indicator pulleys, substantially as set forth.

4. In weighing scales the combination of an eccentrically mounted pulley providing variable leverage, a load operated pulley, a load counter-balancing pulley, a band partially encircling said eccentric and load operated pulleys and secured thereto, a band partially encircling the eccentric and counter-balancing pulleys and secured thereto, a second band carried by the load operated pulley and having a load support, a second band carried by the counter-balancing pulley, a weight carried by the band of the counter-balancing pulley, and a weight indicating device connected to be actuated by the eccentric pulley, substantially as set forth.

5. In weighing scales the combination of a combined eccentric and concentric pulley, the eccentric pulley providing variable leverage; a load operated pulley, a load counter-balancing pulley, a strip band connecting said eccentric and load operated pulleys at points on the perimeters thereof, a strip band connecting said eccentric and counter-balancing pulleys at points on the perimeters thereof, reversely wound strip bands on said weight operated and counter-weight pulleys, a load support and a weight member carried by said reversely wound strip bands respectively, a weight indicator pulley, and a belt connecting said eccentric pulley and the indicator pulley, substantially as set forth.

6. In weighing scales the combination of an eccentrically mounted pulley providing variable leverage, a double load operated pulley having different diameters, a strip band connecting the load pulley of larger diameter with the eccentric pulley, a strip band depending from the load pulley of smaller diameter and adapted to support the load, a double load counter-balancing pulley, a strip band connecting one of the counter-balancing pulleys with the eccentric pulley, a strip band depending from the second counter-balancing pulley, a weight on said strip band, and a weght indicating device, substantially as set forth.

7. In weighing scales the combination of a cylindrical casing, a pair of frames located therein, a plurality of shafts mounted on said frames, an eccentric pulley and concentric pulleys journalled on said shafts respectively, said eccentric pulley providing variable leverage; band strips connecting said pulleys in cooperative relation, load operated and load counter-balancing strip bands having operative connections with said pulleys, a shaft journalled in the frames centrally of the casing, a pulley on said shaft, a belt connecting the eccentric pulley shaft with the pulley on the central shaft, weight indicating members on the respective ends of said central shaft, and transparent closure plates for the casing located immediately adjacent said indicating members, substantially as set forth.

In testimony whereof, I affix my signature.

MERRIT H. RICE.